US012631465B2

(12) United States Patent
Kleen et al.

(10) Patent No.: US 12,631,465 B2
(45) Date of Patent: May 19, 2026

(54) USER INTERFACE, TRANSPORTATION MEANS AND METHOD FOR DISPLAYING A VIRTUAL THREE-DIMENSIONAL NAVIGATION MAP

(71) Applicant: Volkswagen Aktiengesellschaft, Wolfsburg (DE)

(72) Inventors: Andro Kleen, Braunschweig (DE); Kathrin Wilkens, Wolfsburg (DE); Michael Wittkämper, Braunschweig (DE); Ulrich Rautenberg, Hannover (DE); Daniel Gurka, Hannover (DE); Jonas Konrad, Braunschweig (DE); Adrian Haar, Hannover (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 399 days.

(21) Appl. No.: 18/131,842

(22) Filed: Apr. 6, 2023

(65) Prior Publication Data
US 2023/0324197 A1    Oct. 12, 2023

(30) Foreign Application Priority Data
Apr. 11, 2022    (DE) .......................... 102022108773.5

(51) Int. Cl.
*G01C 21/36*          (2006.01)
(52) U.S. Cl.
CPC ....... *G01C 21/3638* (2013.01); *G01C 21/365* (2013.01)
(58) Field of Classification Search
CPC .......................... G01C 21/3638; G01C 21/365
See application file for complete search history.

(56) References Cited

U.S. PATENT DOCUMENTS

| | | | |
|---|---|---|---|
| 2008/0278821 A1* | 11/2008 | Rieger | H04N 13/344 |
| | | | 359/630 |
| 2016/0252363 A1* | 9/2016 | Tertoolen | G01C 21/3655 |
| | | | 701/410 |
| 2018/0197027 A1* | 7/2018 | Ali | F02D 41/042 |
| 2019/0137294 A1* | 5/2019 | Jung | G01C 21/3867 |
| 2021/0019942 A1 | 1/2021 | Ophir et al. | |

FOREIGN PATENT DOCUMENTS

| | | | |
|---|---|---|---|
| CN | 113608614 A | 11/2021 | |
| EP | 3456574 A1 | 3/2019 | |
| WO | WO-2023194209 A1 * | 10/2023 | ............. B60K 35/60 |

OTHER PUBLICATIONS

Priority German Appln. No. DE102022108773.5. Examination Report (Jan. 23, 2023).

* cited by examiner

*Primary Examiner* — Scott A Browne
*Assistant Examiner* — Terry C Buse
(74) *Attorney, Agent, or Firm* — Peter Zura; LOZA & LOZA, LLP

(57) ABSTRACT

Technologies and techniques for displaying a virtual three-dimensional navigation map in a vehicle. A surface of an interior is determined for the vehicle, and a three-dimensional navigation map is loaded. The three-dimensional navigation map is automatically adjusted to the surface, and the adjusted three-dimensional navigation map is represented together with a representation of an ego position of the means of transportation as a virtual, raised model on the surface via an augmented reality display device.

20 Claims, 5 Drawing Sheets

USER INTERFACE, TRANSPORTATION MEANS AND METHOD FOR DISPLAYING A VIRTUAL THREE-DIMENSIONAL NAVIGATION MAP

RELATED APPLICATIONS

The present application claims priority to German Patent App. No. DE 10 2022 108 773.5, to Kleen et al., filed on Apr. 11, 2022, the contents of which is incorporated by reference in its entirety herein.

FIELD OF TECHNOLOGY

Aspects of the present disclosure are related to a means of transportation, a user interface and a method for displaying a virtual three-dimensional navigation map in a means of transportation. Aspects of the present disclosure further relate to an intuitively understandable representation of a navigation function and an intuitively understandable guidance of a user on a route.

BACKGROUND

Navigation systems in means of transportation usually use display elements located permanently in the instrument cluster, in a central information display and/or in a head-up display. Sometimes the representation presents the (inexperienced) user with interpretation difficulties, since the details are shown comparatively small and rotated in relation to reality. This is due in particular to the fact that the display devices installed in means of transportation usually have a vertical rather than horizontal orientation, while the road map would naturally be best understood when oriented horizontally.

In addition, augmented reality displays are known, by means of which users can be shown artificial/virtual content in a predefined relation to the transparent reality. For this purpose, it is necessary for the augmented reality glasses/display to get to know the environment, or for a relationship to be established between the display content and reality. Only then can the display elements be displayed in a quasi contact-analogous manner with regard to the environment and used to improve the information available to the user. Based on the prior art mentioned above, it is an aspect of the present disclosure to support a user in a navigation function in the best possible way.

SUMMARY

In some examples, a method is disclosed for displaying a virtual three-dimensional navigation map in a means of transportation. The three-dimensional navigation map can be present as a data model in a data memory of the means of transportation or can be gradually streamed into the means of transportation. Alternately or additionally, the three-dimensional navigation map can also be stored in a local data memory of an augmented reality (hereinafter also "AR") display device. The augmented reality display device may be configured in the means of transportation and can be configured to optically scan a surface of the interior of the means of transportation, in particular a dashboard of the means of transportation, or to store a data set representing the surface. This process can also be understood as a calibration of the augmented reality display device on the interior surface of the means of transportation. In this case, the augmented reality display device is made aware of a spatial relationship between the surfaces of the interior of the means of transportation and the position of the augmented reality display device or is produced in such a way that the augmented reality display device learns its own position and the position of the respective surface areas of the interior.

In this example, the augmented reality display device is taught, so to speak, to assign certain surrounding areas to the surface of the interior of the means of transportation, while other areas (e.g. window areas) are assigned to an inertial system located outside of the means of transportation. In addition, a three-dimensional navigation map is loaded from a data memory. This data memory can be provided within the means of transportation, in particular within the augmented reality display device and/or outside of the means of transportation. An over-the-air communication connection (via WiFi, WLAN, LTE, LTE-A, etc.) can be provided in particular for data memory located outside of the means of transport.

The shape/form of the surface of the interior of the means of transportation is known on the basis of the optical scanning or calibration. The three-dimensional navigation map or the 3D map model can now be adapted to the surface of the means of transportation. In other words, the navigation map can therefore "virtually" adhere to a curved surface of an interior of the means of transportation over the entire surface, while the three-dimensional navigation map is usually defined and displayed in the plane (e.g., screen plane or similar). The adapted three-dimensional navigation map is then represented together with a representation of an ego position of the means of transportation as a virtual, raised model on the surface using the augmented reality display device.

As is usual with known navigation displays, either the ego position of the means of transportation is guided through the streets or the ego position of the means of transportation is fixed, while the adapted three-dimensional navigation map is shifted according to the movement of the real means of transportation. This form of representation has several advantages: On the one hand, the navigation map can be represented particularly large on the dashboard, since this is comparatively more spacious and the size of the screens in the means of transportation are no longer a limiting factor. On the other hand, the essentially horizontal orientation of the major areas of the dashboard is suitable for generating a particularly intuitively understandable representation of the road map, since the viewer does not have to undertake any perspective adjustment/interpretation. In addition, the augmented reality display device can be used to create a particularly intuitively understandable 3D design of the road map, so that the viewer receives a realistic and a realistic perspective display of the environment of the ego means of transportation.

In some examples, a user interface is disclosed for displaying a virtual three-dimensional navigation map in a means of transportation. The user interface comprises a data input, an evaluation unit and a data output. The aforementioned elements can be configured, for example, as components of an electronic control unit, which can be provided exclusively for the implementation of the present invention in the means of transportation or can be provided as hardware shared with other functions. The user interface may be configured to optically scan a surface of an interior of the means of transportation by means of the data input (and an optical sensor) or to obtain a representation of the same based on data technology. In other words, the surface of the interior is optically scanned/located/localized in terms of position and shape, or the user interface is calibrated accordingly in order to load a three-dimensional navigation map and adapt the data to the surface. Via the data output, the adapted three-dimensional navigation map can be represented together with a representation of an ego position of the means of transportation as a virtual, raised model on the surface using an AR display device. The AR display device can have a transparent screen, which is part of the user interface or is linked to it in terms of information technology via the data output. In other words, the user interface is set up to implement the features, feature combinations and the resulting advantages of the technologies and techniques disclosed herein.

In some examples, a means of transportation is disclosed, which can be configured, for example, as a car, van, truck, motorcycle, aircraft and/or water vehicle. The means of transportation has a user interface according to the aspects disclosed herein and is therefore able to support a navigation function of a user of the means of transportation with the same features, combinations of features and advantages.

BRIEF DESCRIPTION OF THE DRAWINGS

Aspects of the present disclosure are explained in more detail below using exemplary embodiments. In the figures.

DETAILED DESCRIPTION

Figure 1:
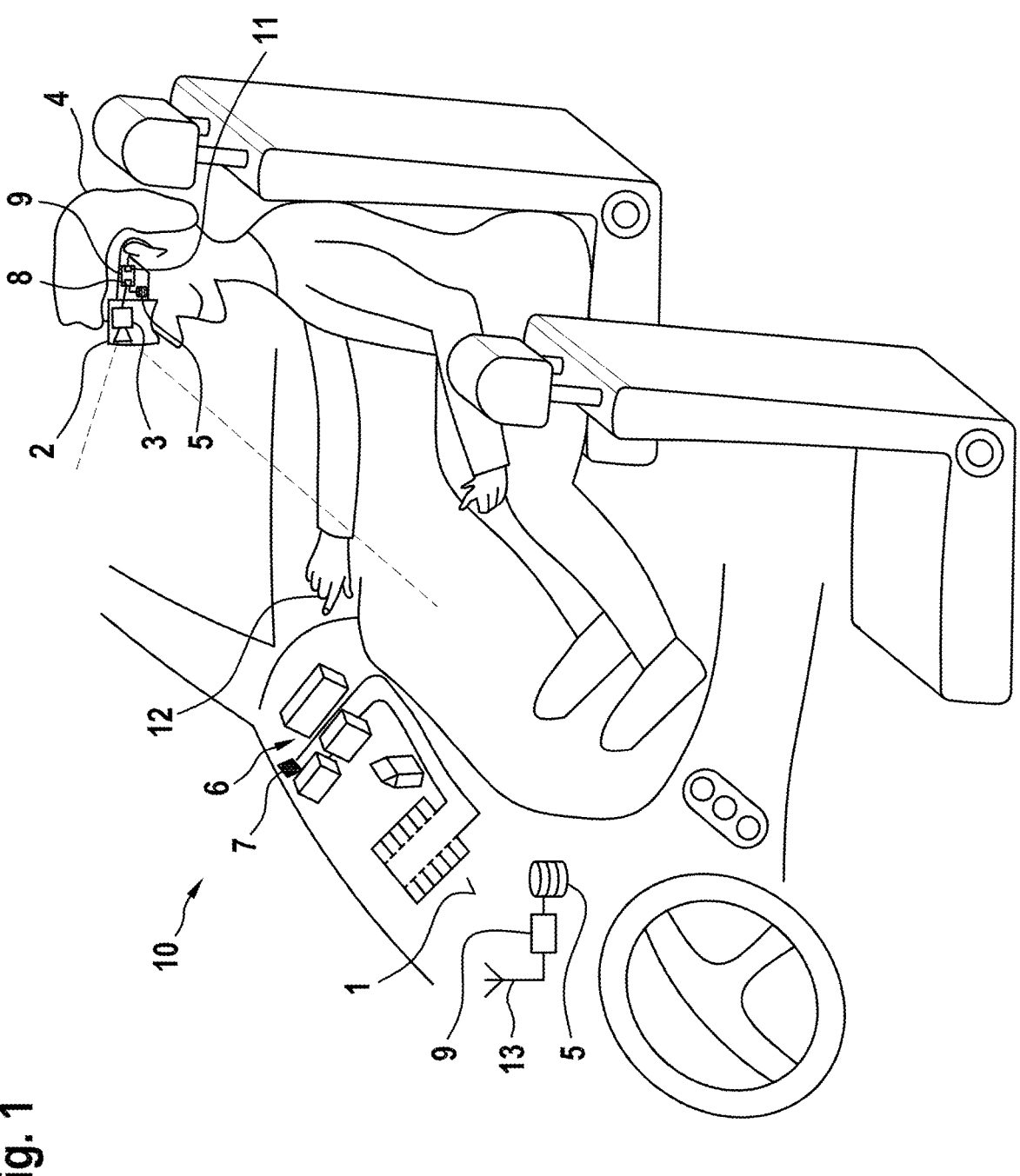
FIG. 1 shows a perspective representation of a passenger space of a means of transportation, in which a user executes an exemplary embodiment of a method on a user interface, according to some aspects of the present disclosure.

In various examples disclosed herein, a surface in the interior of the means of transportation is optically scanned, which may be understood as a scanning or measuring/localizing the surface of the interior. The scanning may be executed automatically in the vehicle, for example after an initial pairing of an augmented reality display device with the means of transportation. This step may additionally or alternatively be performed initially at a factory to provide an initial model for the interface. This model can, for example, be stored in the augmented reality display device, transmitted to it by the means of transportation or made available for download from a server. The scanning process can also be carried out, for example, using a smartphone carried by the user. The scanning step can be carried out each time the means of transportation and/or the augmented reality display device is put into operation, in order to be able to correspond to any changes that may have been made in the function, geometry and color of the surface in the meantime.

The optical scanning of the surface of the interior of the means of transportation can be carried out using an optical sensor of the display device. In other words, the augmented reality display device may be configured with an optical sensor, which is arranged in a housing of the AR display device. In this way, a fixed relationship between the alignment of the optical sensor and the display area is always maintained. When using the AR display device in the means of transportation for the first time, a handshake or calibration process can be started in order to get to know the surfaces of the means of transportation or its interior and to create a kind of "canvas" for the later representation of the adapted three-dimensional navigation map. The optical sensor can be a camera, for example, which is oriented in AR glasses in a direction similar to the direction of view of the user. Thus, by means of the optical sensor, that area which the user sees during use can always be detected optically. Objects in the user's field of vision can thus also be detected and/or body parts of the user can be identified as input means and/or optically highlighted.

In some examples, the AR display device may be configured as a transparent screen, such as a monitor attached to the head in the form of a pixel display. Alternatively, or additionally, the display device can also have a smartphone, a tablet or similar, the camera of which supplies data for depicting the real background on the screen, while the processor expands (augments) the camera image with additional display content or the adapted three-dimensional navigation map.

The three-dimensional navigation map can be loaded, for example, from a data memory of the means of transportation. In particular, the means of transportation can be set up to support the navigation function by sensors of the means of transportation (in particular wheel speed sensors, GPS antenna(s) or the like). The necessary sections of the three-dimensional navigation map can be made available accordingly by the means of transportation of the augmented reality display device. Alternatively, or additionally, a navigation system located in the augmented reality display device can also be used, which obtains map data from the means of transportation or another data memory and uses its own sensors to determine position and progress. This has the advantage that even after getting out of the means of transportation, the navigation function can be continued without wheel speed sensors or being able to carry out a projection onto a dashboard according to the invention.

In some examples, the AR display device can be linked to the means of transportation using information technology (e.g., data communication). A cable (e.g., a USB or monitor cable) and/or an antenna for transmitting wireless information signals (e.g., via Bluetooth, WiFi, WLAN or the like) can be used for this purpose. After linking by information technology, the means of transportation can communicate with the AR display device and vice versa Sensor information, map data and information about the respective operating status can be exchanged in order to be able to react to it if necessary. For example, a change in an optical appearance of the means of transportation in the area of the surface used to display the adapted three-dimensional navigation map can be determined by other circumstances. For example, a display element of the means of transportation, in particular a windshield root display or a display device located in the dashboard, can be put into operation or operated with a different intensity and/or with a different content. To prevent the modified visual appearance from compromising or interfering with the visual representation of the adapted three-dimensional navigation map, the adapted three-dimensional navigation map and/or its representation may be adapted using the AR display device. For example, content may be shifted to a different location on the surface of the interior of the means of transportation.

Alternatively, or additionally, an intensity and/or a color of a represented element of the adapted three-dimensional navigation map can be changed in order to prevail over the modified optical appearance of the means of transportation or not to interfere with the same. In order to determine the modified visual appearance, the means of transportation, which is naturally the first to gain knowledge of what changes are occurring with regard to its signaling devices, can send a wireless message to the AR display device. Alternatively, or additionally, the AR display device can use its own optical sensor to determine the modified optical appearance of the means of transportation in the area of the surface and make a suitable adaptation to the representation of the adapted three-dimensional navigation map independently of communication with the means of transportation. This enables a particularly uncomplicated coexistence of the display device of the means of transportation and the adapted three-dimensional navigation map.

A navigation function can be supported particularly intuitively by automatically determining an impending maneuver of the means of transportation. Conventionally, such events are usually supported by detailed representations and/or the output of acoustic instructions to the driver. In the present disclosure however, as a response, the representation of the ego position of the means of transportation is additionally extracted from the adapted three-dimensional navigation map. In this case, for example, a cursor or indication that initially coincides with the representation of the ego position is optically lifted upwards and transferred from the adapted three-dimensional navigation map located in the means of transportation to the vehicle environment. In other words, the ego position or a pointer that initially correlates with it rises from the surface and locates itself in a contact-analogous manner with that position in the real vehicle environment at which the maneuver is to be carried out. This can mean, for example, that the dashboard of the means of transportation shows a representation of the ego position, initially in a vertical (Z-direction) ascending cursor with the windshield overlapping at such a position by means of the AR display device, which optically corresponds to an intersection at which the means of transportation has to turn. Here, the representation or the element rising from the adapted three-dimensional navigation map can be subjected to a change in shape and/or a change in color and/or a change in intensity in order to make it clear to the user that strictly speaking no longer the ego position is represented, but a future target ego position or a directional arrow or something similar. Due to the transition between the localization of the representation of the ego position in the adapted three-dimensional navigation map in a virtual contact-analogous movement element, the user's gaze and attention are guided particularly intuitively and the navigation function is structured more understandably than in the prior art.

As soon as the means of transportation changes direction, especially in an intersection situation, the display of the three-dimensional navigation map can be automatically adapted accordingly, so that the viewer experiences a rotation of the navigation map on the surface, especially parallel to the external environment. In particular, this can depend on the preselected setting "Map showing the direction of travel". Optionally, this rotation can also take place with a time offset, so that the driver is not distracted by the rotation during a driving maneuver.

In some examples, the user can interact with the elements of the adapted three-dimensional navigation map. For example, the user can tap on a building or its representation in order to have information relating to the building displayed using the augmented reality display device. For example, the information can be represented on the surface of the 3D representation of the respective building and/or illustrated via a text field floating above the building or its representation.

If the building selected by the user is already in the user's field of vision, the information can alternatively or additionally be assigned to the real building in the surroundings by means of the AR display device. The building of interest to the user is therefore selected within the adapted three-dimensional navigation map and is determined in particular by means of the optical sensor of the AR display device, while the information is optionally represented in the 3D representation of the building and/or contact-analogously in the (real) environment of the means of transportation.

FIG. 1 shows a driver's space of a means of transportation 10 configured in the form of a passenger car, on whose passenger seat an occupant 4 in the form of a passenger has taken a seat. Occupant 4 wears an AR display device 2, which has an optical sensor 3 in the form of a 2D camera, which is substantially aligned in the viewing direction. Optical sensor 3 is communicatively coupled to data input 8 of an electronic control unit 9. A data memory 5 located in AR display device 2 is also connected for information purposes via data input 8. Image material determined by means of electronic control unit 9 can be displayed on AR display device 2 via a data output 11. Using optical sensor 3, three-dimensional navigation map material sent from a control unit 9 of the means of transportation via an antenna 13 of the means of transportation is sent to AR display device 2 and is virtually located on dashboard 1 of the means of transportation 10 in such a way that a representation of a 3D map model adapted to the curved surfaces of dashboard 1 is obtained in the form of an adapted three-dimensional navigation map 6.

A representation 7 of an ego position of means of transportation 10 is shown within the adapted three-dimensional navigation map 6. In particular, a limb 12 of occupant 4 in the form of a hand has been detected in the detection range of optical sensor 3. Occupant 4 points to a representation of a building within the adapted three-dimensional navigation map 6. In response to a confirmation or the expiry of a predefined period of time, information regarding the building is displayed by means of augmented reality display device 2 in a contact-analogous manner to the representation of the building (not shown).

Figure 2:
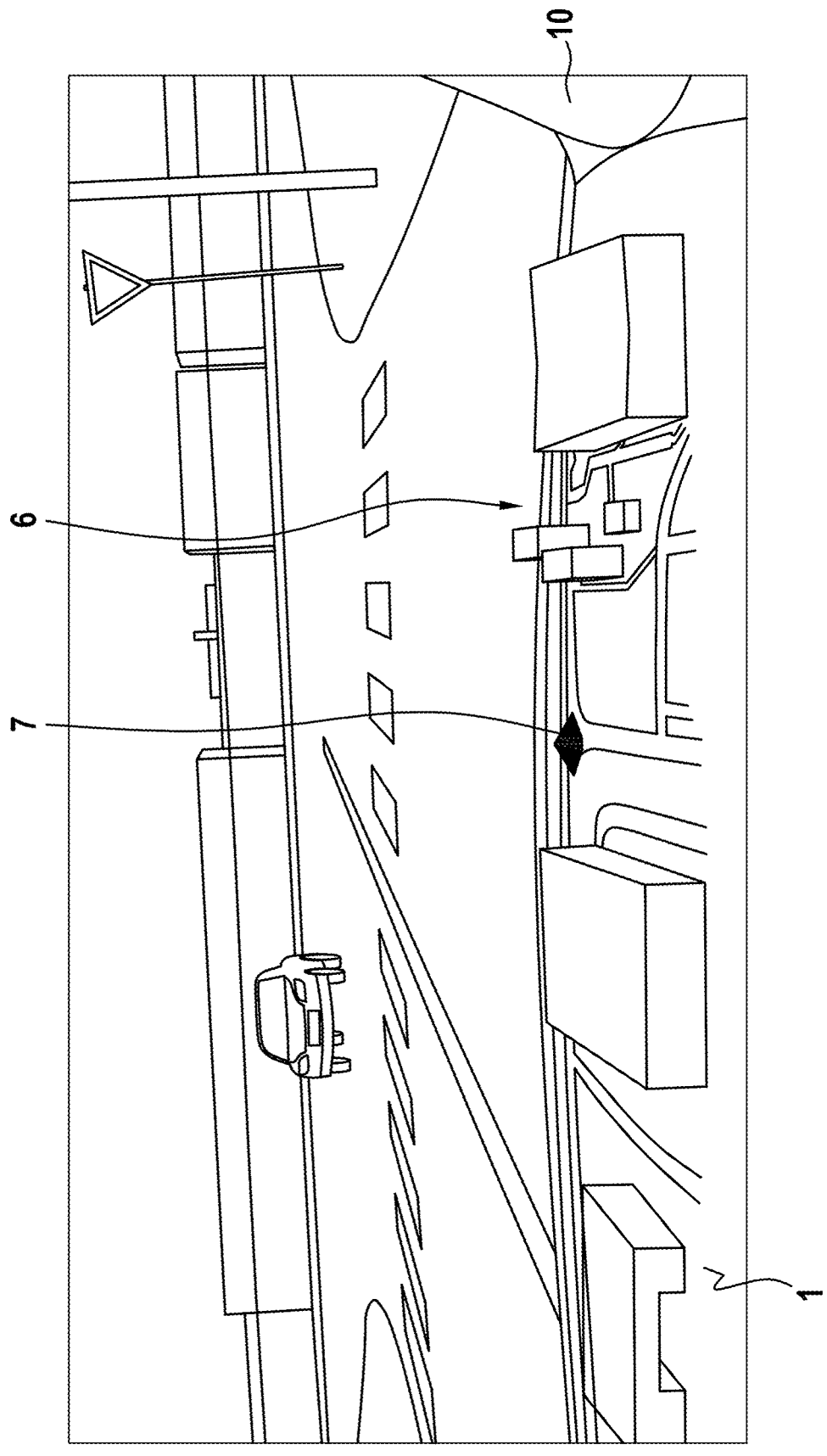
FIG. 2 shows a perspective view of a passenger space from the perspective of a passenger as an occupant in a first operating state, according to some aspects of the present disclosure.

FIG. 2 shows the occupant's view (reference numeral 4 in FIG. 1) while approaching a T-intersection. The ego position of means of transportation 10 is marked by a representation 7 in adapted three-dimensional navigation map 6.

Figure 3:
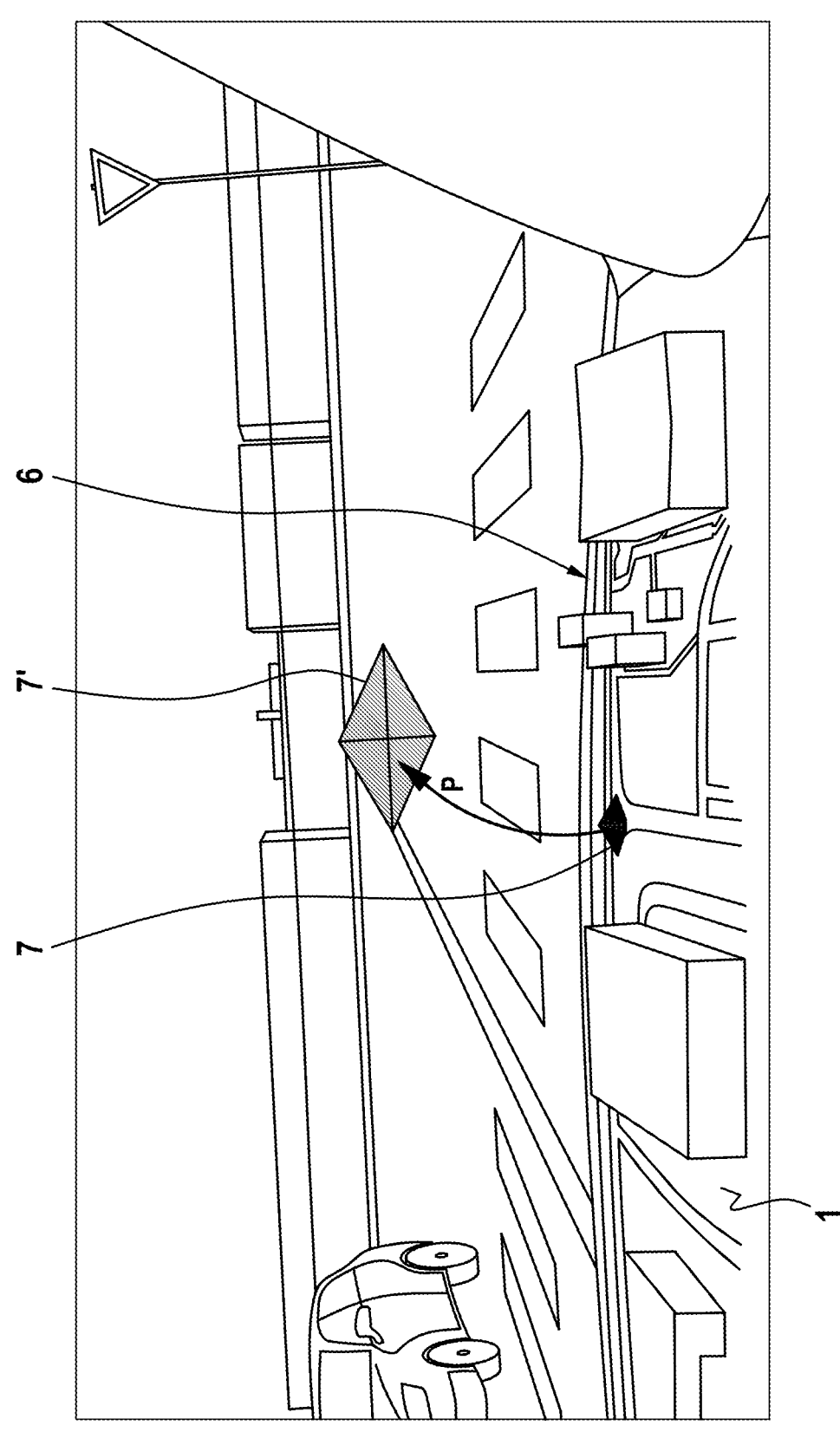
FIG. 3 shows a perspective representation of a passenger space from the perspective of a passenger as an occupant in a second operating state, according to some aspects of the present disclosure.

FIG. 3 shows the operating environment shown in FIG. 2 after the means of transportation 10 further approaches the T-intersection. As illustrated by an arrow P, a modified representation 7' of means of transportation 10 has passed into the (real) environment of means of transportation 10 as a future ego position. Modified representation 7' now "flies" virtually ahead of means of transportation 10 and changes its size and shape in the process.

Figure 4:
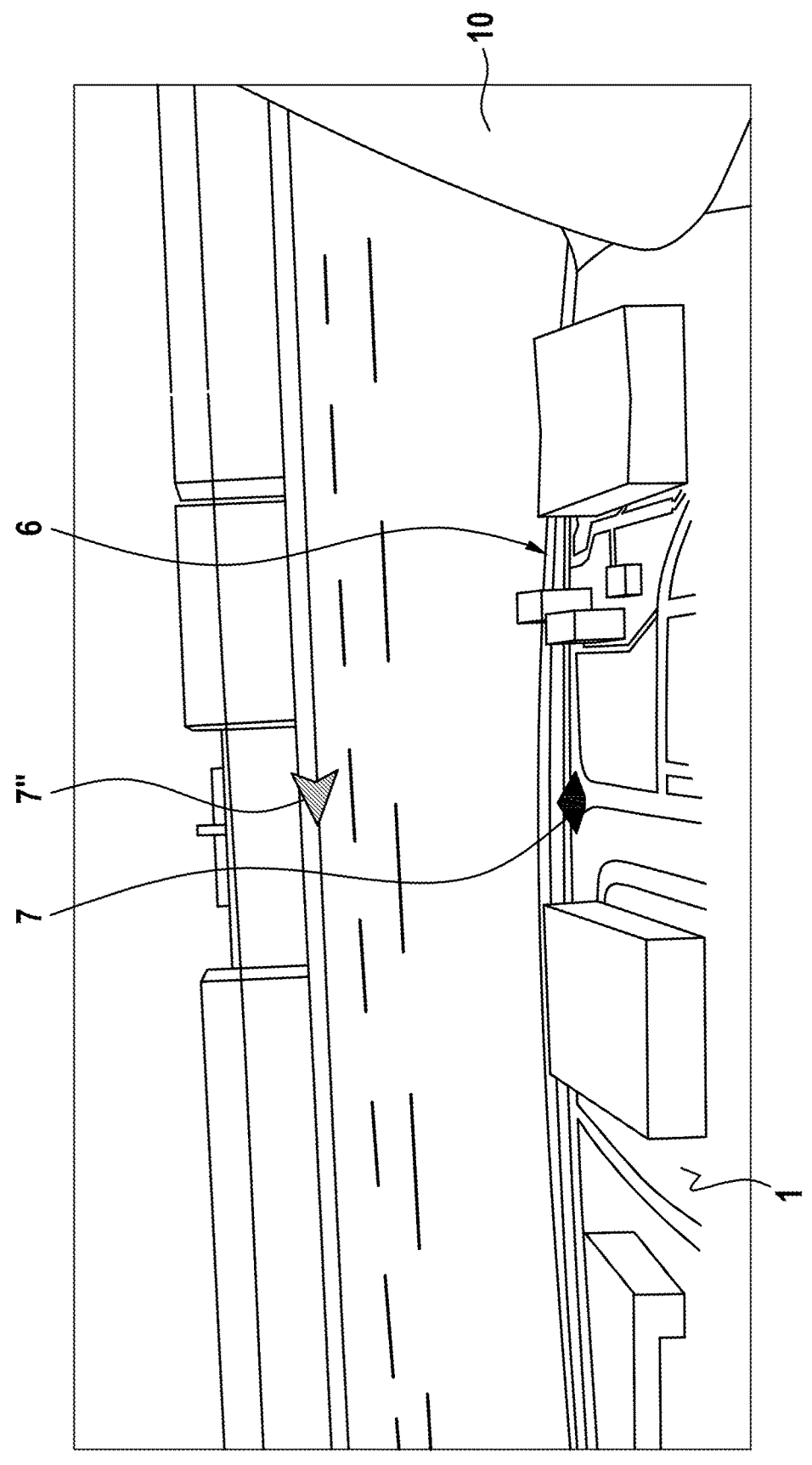
FIG. 4 shows a perspective representation of a passenger workplace from the perspective of a passenger as an occupant in a third operating state, according to some aspects of the present disclosure.

FIG. 4 shows the operating environment of FIG. 3 after modified representation 7' has "reached" a predefined turning position. At this position, a further modified representation 7" is shown in the form of an arrowhead, which announces the left turning maneuver for the driver of means of transportation 10 at the predefined position in the area. In a manual driving mode or a manually guided means of transportation 10, the user now has to reduce the speed and make a steering movement to the left. In the case of an autonomously driving means of transportation 10, the user is merely informed that means of transportation 10 will now decelerate and turn to the left. In the case of autonomously driving means of transportation 10, this effectively prevents kinetosis, since the user can adjust to the forces to be expected.

Figure 5:
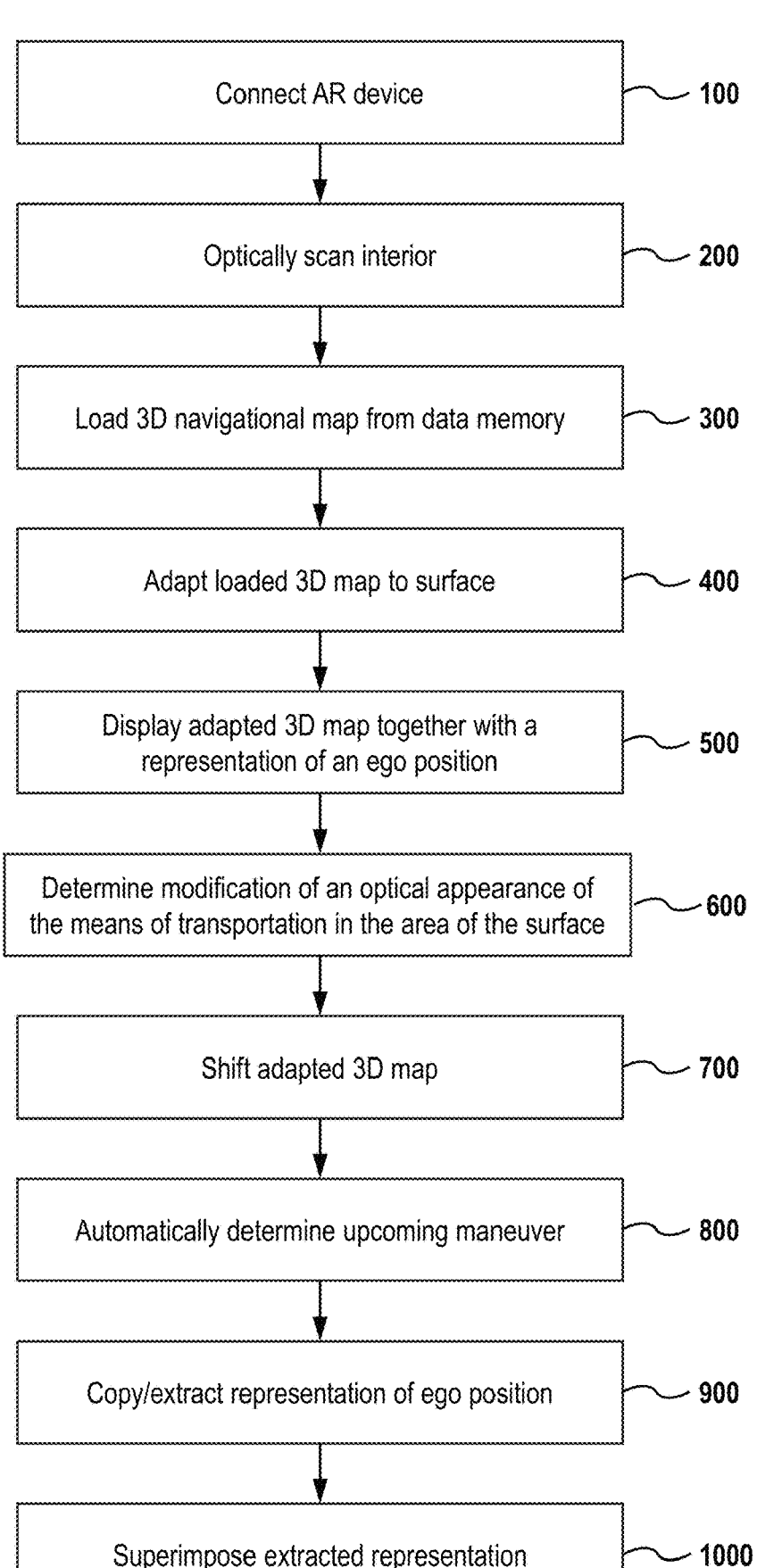
FIG. 5 shows a flow chart illustrating steps of an exemplary embodiment of a method for displaying a virtual three-dimensional navigation map in a means of transport, according to some aspects of the present disclosure.

FIG. 5 shows steps of an exemplary embodiment of a method for displaying a virtual three-dimensional navigation map in a means of transportation. In step 100, an augmented reality (AR) display device is connected to the means of transportation in terms of information technology. In this case, a wireless communication link is set up between the AR display device and the means of transportation. In step 200, a surface of an interior of the means of transportation is optically scanned by means of an optical sensor of the AR display device. Here, the AR display device creates a surface model of the interior of the means of transportation. In step 300, a three-dimensional navigation map is loaded from a data memory. In step 400, the loaded three-dimensional navigation map is adapted to the surface of the means of transportation according to the result of the scanning. In this case, a curvature of the three-dimensional navigation map is generated in order to achieve full-surface virtual correspondence of the three-dimensional navigation map with the surface of the interior.

In step 500, the adapted three-dimensional navigation map is displayed together with a representation of an ego position of the means of transportation as a virtual, raised model on the surface of the means of transportation using an augmented reality (AR) display device. This creates a large and a realistic perspective representation of the vehicle environment and is used to illustrate the navigation function. In step 600, a modification of an optical appearance of the means of transportation in the area of the surface is then determined. For example, the means of transportation may report that a display in a windshield root display could result in an overlay of content from the adapted three-dimensional navigation map. In step 700, the adapted three-dimensional navigation map is therefore shifted in order to be able to display the content displayed in the windshield root display without being overlaid by the content of the AR display device.

In step 800, an upcoming maneuver for the means of transportation is automatically determined. In order to make it as easy as possible for the user to relate to the surrounding position of the maneuver, in step 900 a representation of the ego position is first copied from the adapted three-dimensional navigation map and then extracted. In step 1000, the extracted representation of the ego position is superimposed on a detail of the environment of the means of transportation in a contact-like manner, so that the user can immediately recognize the extracted representation as the environmental position at which the upcoming maneuver is to be carried out.

LIST OF REFERENCE NUMERALS

1 dashboard
2 augmented reality (AR) display device
3 optical sensor
4 occupant
5 data memory
6 adapted three-dimensional navigation map

7 representation of the ego position
7' modified representation of the ego position
7" further modified representation of the ego position
8 data input
9 electronic control unit
10 means of transportation
11 data output
12 limb of the user
13 antenna
100 to 1000 process steps
The invention claimed is:

1. A method for displaying a virtual three-dimensional navigation map in a means of transportation, comprising:
loading the three-dimensional navigation map;
automatically adjusting the three-dimensional navigation map to a surface of an interior of the means of transportation based on a surface model representing the surface of the interior of the means of transportation; and
representing the adjusted three-dimensional navigation map together with a representation of an ego position of the means of transportation as a virtual, raised model on the surface using an augmented reality display device.

2. The method according to claim 1, wherein the surface comprises an instrument panel and/or a dashboard.

3. The method according to claim 2, wherein the augmented reality display device comprises a screen mounted to the head of an occupant.

4. The method according to claim 1, wherein the three-dimensional navigation map is loaded from a data memory of the means of transportation.

5. The method according to claim 1, wherein the augmented reality display device is operatively coupled to the means of transportation via a cable and/or a wireless connection.

6. The method according to claim 1, further comprising:
determining a modification of an optical appearance of the means of transportation in the area of the surface; and
adjusting the adjusted three-dimensional navigation map via the augmented reality display device.

7. The method according to claim 1, further comprising:
automatically determining an upcoming maneuver of the means of transportation, and, in response thereto,
automatically detaching the representation of the ego position from the adapted three-dimensional navigation map, and
overlaying a detail of an environment of the means of transportation by the representation of the ego position via the augmented reality display device.

8. The method according to claim 1, further comprising:
scanning the surface of an interior of the means of transportation via an optical sensor of the display device, and/or
loading a pre-scanned optical sensor representation of the surface of the interior.

9. A user interface for displaying a virtual three-dimensional navigation map in a means of transportation, comprising:
a data input;
an evaluation unit; and
a data output,
wherein the data input is configured to receive a representation of a surface of an interior of the means of transportation, and load a three-dimensional navigation map,
wherein the evaluation unit is configured to adapt the three-dimensional navigation map to the surface based on a surface model representing the surface of the interior of the means of transportation, and wherein the data output is configured to represent the adapted three-dimensional navigation map together with a representation of an ego position of the means of transportation as a virtual, raised model on the surface via an augmented reality display device.

10. The user interface according to claim 9, wherein the surface comprises an instrument panel and/or a dashboard.

11. The user interface according to claim 10, wherein the augmented reality display device comprises a screen mounted to the head of an occupant.

12. The user interface according to claim 9, wherein the three-dimensional navigation map is loaded from a data memory of the means of transportation.

13. The user interface according to claim 9, wherein the augmented reality display device is operatively coupled to the means of transportation via a cable and/or a wireless connection.

14. The user interface according to claim 9, wherein the user interface is configured to:

determine a modification of an optical appearance of the means of transportation in the area of the surface; and adjust the adjusted three-dimensional navigation map via the augmented reality display device.

15. The user interface according to claim 9, wherein the user interface is configured to:

automatically determine an upcoming maneuver of the means of transportation, and, in response thereto, automatically detach the representation of the ego position from the adapted three-dimensional navigation map, and overlay a detail of an environment of the means of transportation by the representation of the ego position via the augmented reality display device.

16. The user interface according to claim 9, wherein the user interface is configured to:

scan the surface of an interior of the means of transportation via an optical sensor of the display device, and/or load a pre-scanned optical sensor representation of the surface of the interior.

17. A means of transportation comprising a user interface for displaying a virtual three-dimensional navigation map in a means of transportation, comprising:

a data input;

an evaluation unit; and a data output, wherein the data input is configured to receive a representation of a surface of an interior of the means of transportation, and load a three-dimensional navigation map, wherein the evaluation unit is configured to adapt the three-dimensional navigation map to the surface based on a surface model representing the surface of the interior of the means of transportation, and wherein the data output is configured to represent the adapted three-dimensional navigation map together with a representation of an ego position of the means of transportation as a virtual, raised model on the surface via an augmented reality display device.

18. The means of transportation according to claim 17, wherein the surface comprises an instrument panel and/or a dashboard, and wherein the augmented reality display device comprises a screen mounted to the head of an occupant.

19. The means of transportation according to claim 17, wherein the user interface is configured to:

automatically determine an upcoming maneuver of the means of transportation, and, in response thereto, automatically detach the representation of the ego position from the adapted three-dimensional navigation map, and overlay a detail of an environment of the means of transportation by the representation of the ego position via the augmented reality display device.

20. The means of transportation according to claim 17, wherein the user interface is configured to:

scan the surface of an interior of the means of transportation via an optical sensor of the display device, and/or load a pre-scanned optical sensor representation of the surface of the interior.

* * * * *